(12) United States Patent
Gans et al.

(10) Patent No.: US 7,165,814 B2
(45) Date of Patent: Jan. 23, 2007

(54) SLEEVE ARRANGEMENT FOR A NECK REST

(75) Inventors: Matthias Gans, Wittighausen (DE); Uwe Stapf, Röttingen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 11/205,074

(22) Filed: Aug. 17, 2005

(65) Prior Publication Data
US 2006/0119163 A1    Jun. 8, 2006

(30) Foreign Application Priority Data
Oct. 29, 2004   (DE)   ...................... 10 2004 052 604

(51) Int. Cl.
*A47C 7/38*   (2006.01)
(52) U.S. Cl. .................... 297/391; 297/404; 297/463.1
(58) Field of Classification Search ............ 297/463.1, 297/391, 463.2, 410
See application file for complete search history.

(56) References Cited
U.S. PATENT DOCUMENTS
4,976,493 A * 12/1990 Frankila ..................... 297/410
5,080,437 A * 1/1992 Pesta et al. .................. 297/410
5,445,434 A * 8/1995 Kohut ......................... 297/391
5,788,250 A * 8/1998 Masters et al. ............. 297/410
6,296,316 B1 * 10/2001 Hann ....................... 297/463.1
7,086,701 B2 * 8/2006 Runde ........................ 297/410

FOREIGN PATENT DOCUMENTS
DE       198 19 502 A1    11/1999

* cited by examiner

*Primary Examiner*—Anthony D. Barfield
(74) *Attorney, Agent, or Firm*—Lowe Hauptman & Berner, LLP

(57) ABSTRACT

A sleeve arrangement for a neck rest, including a sleeve body adapted to be inserted into an opening in a frame of a vehicle seat, the sleeve body having a through going axial passage adapted to accommodate a rod of the neck rest, and the sleeve body having further a head portion which includes internal locking elements to fix the axial position of the rod in the sleeve body and a shank portion joining the head portion, the sleeve body having an external side which includes fixing elements the sleeve body in the opening of the frame, wherein in upper and lower end portions the passage has radially annular enlargements, and a preferably radially expandable sliding bushing of anti-frictional plastic material is accommodated by the enlargements which encircle the rod, and an elastomeric material is accommodated in the intermediate space between the sliding bushing and a wall of the passage.

18 Claims, 1 Drawing Sheet

SLEEVE ARRANGEMENT FOR A NECK REST

RELATED APPLICATIONS

The present application is based on, and claims priority from, German Application Number 10 2004 052 604.4, filed Oct. 29, 2004, the disclosure of which is hereby incorporated by reference herein in its entirety.

This invention is related to a sleeve arrangement for a neck rest according to the preamble of patent claim 1.

BACKGROUND OF THE INVENTION

Neck rests on the seat back rests of vehicles have usually two parallel spaced rods of the neck rest, which are accommodated in sleeve arrangements for the neck rest, which are fixed on the frame of the back rest. The neck rest rods are often bent in a U-shape. The bridge of the U-shaped portion is located inside of the neck rest.

Known sleeve arrangements for neck rests have a head portion and a shank portion. The shank portion has a through going axial passage in which a rod of the neck rest is accommodated. The head portion is equipped with a locking means, which co-operates with grooves, a toothing or the like in a rod of the neck rest. Through this, it is possible to arrest the neck rest on a predetermined height or to change the desired height of the neck rest, respectively. Further, it is known to realise the head portion and the shank portion into a one-piece sleeve body made of plastic material.

The sleeve body or the sleeve shank, respectively, is fixed in a frame of the back rest of the seat. Through this, the arrangement of the sleeve arrangement for the neck rest is dependent from tolerances. The sleeve arrangement for the neck rest, on its part, is subject to tolerances when it is manufactured. In the U-shaped rods of the neck rest, a tolerance has also to be expected. The distance of the rods for the neck rest is not exactly always the same. If it does not correspond to the distance of the axes of the installed sleeve arrangement for the neck rest, the rods of the neck rest have to be bent somewhat, either apart from each other or towards each other. However, by doing so they are no more exactly parallel. In order to compensate the individual tolerances, the accommodation of the rod of a neck rest in a sleeve arrangement for the neck rest has to admit variances. However, through this there is the danger that noise is generated in the sleeve arrangements for the neck rest during driving by a vibration of the neck rest or the rods of the neck rest, respectively, which is unpleasant for the user of the seat, particularly as it is generated in the region of the ears of the user of the seat. In this context, it has already become known to pre-stress the neck rest rods inside the sleeve arrangement for the neck rest by springs, in order to regulate the sliding movement of the neck rest rod in the interior of the sleeve arrangement for the neck rest on the one hand, and to dampen the described noise on the other hand. However, with the known means, damping of the noise can only be achieved in an insufficient manner.

SUMMARY OF THE INVENTION

The invention is based on the objective to provide a sleeve arrangement for a neck rest by which a broad tolerance compensation is possible and in which an effective noise dampening is achieved at the same time.

This objective is resolved by the features of patent claim 1.

In the sleeve arrangement for a neck rest according to the invention, which has an upper and a lower end, as is well known, radially annular enlargements are provided in the end portions of the axial passage, which preferably accommodate radially expandable sliding bushings. The sliding bushings are dimensioned such that they encircle the neck rest rod and induce a predetermined friction between the neck rest rod, which is usually made from steel, and the bushing, which is made from an anti-frictional plastic material. Preferably, the sliding bushing is apt to be radially expanded. According to one form of realisation of the present invention, this expansion can be achieved through that the bushing is slit or parted in the direction parallel to the axis, respectively.

Between the sliding bushing seated in the sleeve portion and the assigned wall of the passage there is arranged a clearance, preferably an annular clearance. In this clearance, elastomeric material is disposed, which is supported by the wall of the clearance. According to one form of realisation of the present invention, the elastomeric material is a plastic foam, preferably a PUR-foam. When the neck rest rod moves transversely to its longitudinal axis inside the sleeve arrangement for a neck rest according to the invention, this is possible without further trouble due to the floating mounting or the radial resilience of the sliding bushing, respectively. In this, the expandable sleeve is radially supported by the elastomeric material, through which the sideways movement of the neck rest rod is attenuated and the neck rest rod experiences a restoring force into a neutral position at the same time.

Thus, with the aid of the sleeve arrangement for a neck rest according to the present invention, the tolerance for the dimensioning of the neck rest rod and the disposition of the sleeve arrangement for a neck rest in a back rest of a seat can be handled generously. The bushing inside the sleeve arrangement for a neck rest is mounted quasi floatingly, and allows for a lateral compensation. The elastomeric material, PUR-foam in particular, provides stability and attenuation for this floating mounting.

According to another form of realisation of the present invention, the sliding bushings at the ends have conical bore portions, widening towards the ends thereof. Through this, it is easier to introduce the neck rest rod into the bushing. Through the feature that the conical portions are formed on both ends of the bushing, it does not play any role by which end the bushing is inserted into the shank body. Further, the conical portions enable easy sliding of bent neck rest rods.

The assembly of sleeve body, sliding bushing and elastomeric material is made on the site of manufacturing. Thereafter, the installation into the neck rest back takes place, when the neck rest is already fixed on the neck rest rods.

In order to facilitate the insertion of the sliding bushings and of the elastomeric material, it is provided that shank portion and head portion are separately formed parts and that bringing together of the head portion and the shank portion takes place only after the shank portion has been completely mounted. Preferably, the head portion is pushed onto the upper end of the sleeve portion, and thus engages against a radial outer flange of the shank portion. It has to be provided by locking or gluing or by any other way that the head portion is securely connected to the shank portion. As is known, a means is situated in the head portion which co-operates with a toothing or individual, axially spaced recesses of the neck rest rod in order to adjust it in a desired height. Mostly, this means is a spring that can be actuated with the aid of a button on the outer side of the head portion, in order to release a locking for a short time.

BRIEF DESCRIPTION OF THE DRAWING

One form of realisation of the present invention will be illustrated below by means of drawings.

DETAILED DESCRIPTION OF THE INVENTION

Figure 1:
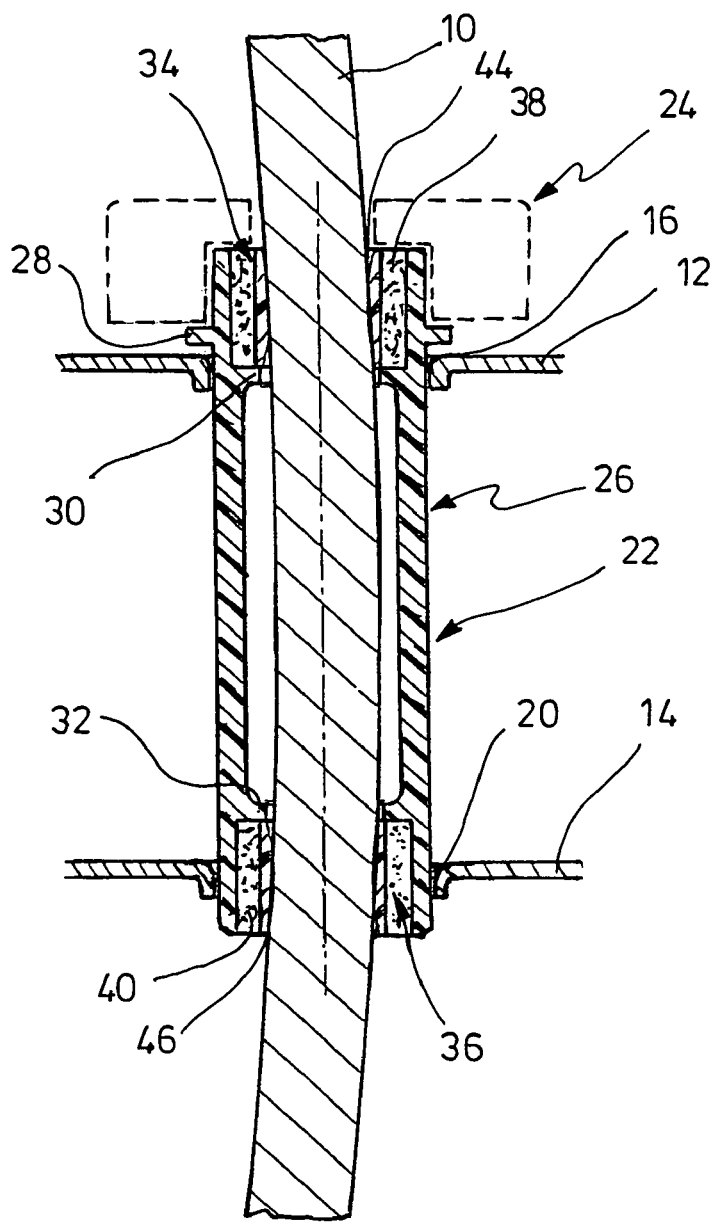
FIG. 1 shows a section through a sleeve arrangement for a neck rest according to the present invention.

In FIG. 1, a neck rest rod 10 is indicated, which belongs to a rod arrangement which is shackle-shaped or U-shaped, respectively. Two parallel neck rest rods are generated from a linear rod piece by bending, the bridge portion between the legs of the thus formed U-shape running inside a neck rest and the latter being attached on the bridge portion. Such shackle-shaped realisations of neck rests are per se known.

Furthermore, plates are indicated in FIG. 1 at 12 and 14, respectively, which belong to a frame which constitutes the supporting arrangement for a back rest of a vehicle seat. Details of the seat or the frame, respectively, are not represented. One recognises that openings 16, 20 are formed in each of the plates 12, 14, the edge of the openings being bent towards the bottom. This takes place by a deep-drawing operation.

In FIG. 1, one further recognises a sleeve body 22, which is constituted by a dashed head portion 24 and shank portion 26. The shank portion has a through going passage and it has a constant outer diameter across its length. Only in the upper region a flange 28 is formed, radially directed towards the outside. The outer diameter of the shank portion 26 is realised such that it is slightly smaller than the diameter of the openings 16, 20. On the outer side of the shank portion 26, rib-like protrusions or the like can be provided (not shown), in order to fix the sleeve body 26 largely immovable in the plates 12, 14. In doing so, the flange 28 engages against the upper side of the plate 12.

A through going passage in the shank portion 26 is partially interrupted in its upper and lower end portion by flanges 30 and 32, respectively, which are radially directed towards the inside. In the flanges 30, 32, openings are formed, the diameter of which is larger than the diameter of the neck rest rod 10. Above the radial flange 30, a first sliding bushing 34 is inserted, which is supported by the flange 30. Below the radial flange 32, a sliding bushing 36 is arranged. The outer diameter of the sliding bushings 34, 36 is significantly smaller than the inner diameter of the upper and lower end portions of the passage of the sleeve shank 26. In the thus formed ring-spaces, PUR-foam is introduced at 38 and 40, respectively, the axes of the bushings 34, 36 being approximately aligned to the longitudinal axis of the shank portion 26 in doing so. The sliding bushings 34, 36 are slit, as can be recognised for the bushing 34 in FIG. 2 at 42. The divided realisation of the bushings 34, 36 enables a radial expansion in a traverse movement of the rod 10. Thus, the rod can also exert a traverse movement upon shocks of the vehicle back rest, however, it is effectively dampened by the expansion of the bushings 34, 36 and, particularly, by the deformation of the elastomeric material 38, 40 in the sleeve portion 26.

As can be further recognised in FIG. 1, the end portions of the bores in the sliding bushings 36, 34 are conically formed, as is indicated at 44 for the bushing 34 and at 46 for the bushing 36, for example. The conical portions taper towards the other end of the bushing and form insertion portions for the neck rest rod 10 when it is installed. As the conical portions are provided on both end of the bushings 34, 36, it has not to be paid attention in the installation in which orientation the bushings 34, 36 are inserted.

As can be recognised, the openings in the flanges 30, 32 are larger in diameter than the diameter of the rod 10, so that the described movement is in fact possible for the rod 10, but is dampened by the described arrangement on the upper and lower end of the shank portion 26, in doing so any generation of noise is also avoided.

In FIG. 1, the head portion 24 is drawn in a dashed manner, which has a cylindrical recess such that the head portion 24 can be put on the portion of the shank portion 26 above the flange 28 in an approximately matching fashion. Preferably, a locking connection or even a gluing connection is provided in order to connect head portion 24 and shank portion 26 fixedly with each other. In the head portion 24, locking means (not shown) are seated, which co-operate with locking teeth or the like of the neck rest rod 10 in a known manner.

Figure 2:
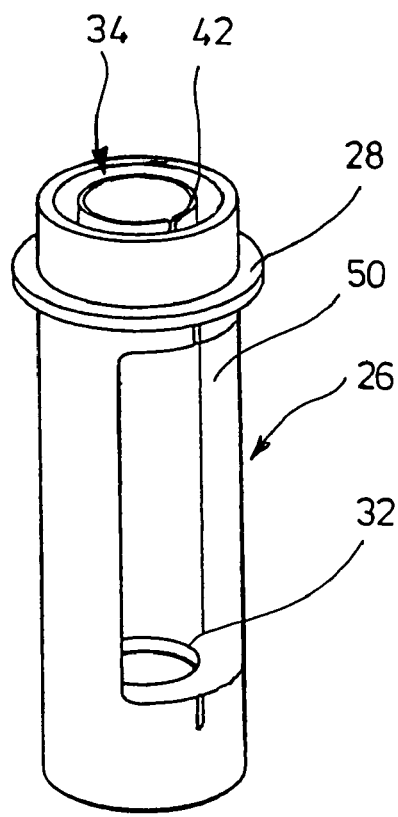
FIG. 2 shows a perspective view of a shank portion of the sleeve arrangement for a neck rest after FIG. 1

In addition, it should be mentioned for FIG. 2 that a longish window is formed in the shank portion 26 between the flanges 30, 32. It serves only for purposes of manufacturing and has no significance for the function.

The invention claimed is:

1. A sleeve arrangement for a neck rest, comprising a sleeve body adapted to be inserted into an opening in a frame of a vehicle seat, the sleeve body having a through going axial passage adapted to accommodate a rod of the neck rest, and the sleeve body having further a head portion which includes internal locking elements to fix the axial position of the rod in the sleeve body and a shank portion joining the head portion, the sleeve body having an external side which includes fixing elements the sleeve body in the opening of the frame, wherein upper and lower end portions the passage has radially annular enlargements, and a radially expandable sliding bushing of anti-frictional plastic material is accommodated by the enlargements which encircle the rod, and an elastomeric material is accommodated in the intermediate space between the sliding bushing and a wall of the passage.

2. The sleeve arrangement of claim 1, wherein a portion in the passage in the shank portion between the annular enlargements has an larger diameter than the rod and is separated from the radial enlargements by radially inwardly facing flanges, and openings in the radial flanges have a larger diameter than the outer diameter of the rod.

3. The sleeve arrangement of claim 2, wherein the elastomeric material is an elastomeric plastic foam.

4. The sleeve arrangement of claim 3, wherein the elastomeric plastic foam is PUR-foam.

5. The sleeve arrangement of claim 2, wherein the sliding bushes are slit or parted, respectively.

6. The sleeve arrangement of claim 2, wherein the bore of the sliding bushings at the ends have conical bore portions widening towards the ends thereof.

7. The sleeve arrangement of claim 2, wherein at the upper end the shank portion has an outer radial flange which is axially engaged by a separate head portion if the head portion is positioned on the shank portion between the outer flange and the upper end of the shank portion, the head portion being axially attachable to the shank portion.

8. The sleeve arrangement of claim 1, wherein the elastomeric material is an elastomeric plastic foam.

9. The sleeve arrangement of claim 8, wherein the sliding bushes are slit or parted, respectively.

10. The sleeve arrangement of claim 8, wherein at the upper end the shank portion has an outer radial flange which is axially engaged by a separate head portion if the head portion is positioned on the shank portion between the outer flange and the upper end of the shank portion, the head portion being axially attachable to the shank portion.

11. The sleeve arrangement of claim 8, wherein the bore of the sliding bushings at the ends have conical bore portions widening towards the ends thereof.

12. The sleeve arrangement of claim 8, wherein the elastomeric plastic foam is PUR-foam.

13. The sleeve arrangement of claim 1, wherein the sliding bushes are slit or parted, respectively.

14. The sleeve arrangement of claim 13, wherein the bore of the sliding bushings at the ends have conical bore portions widening towards the ends thereof.

15. The sleeve arrangement of claim 13, wherein at the upper end the shank portion has an outer radial flange which is axially engaged by a separate head portion if the head portion is positioned on the shank portion between the outer flange and the upper end of the shank portion, the head portion being axially attachable to the shank portion.

16. The sleeve arrangement of claim 1, wherein the bore of the sliding bushings at the ends have conical bore portions widening towards the ends thereof.

17. The sleeve arrangement of claim 16, wherein at the upper end the shank portion has an outer radial flange which is axially engaged by a separate head portion if the head portion is positioned on the shank portion between the outer flange and the upper end of the shank portion, the head portion being axially attachable to the shank portion.

18. The sleeve arrangement of claim 1, wherein at the upper end the shank portion has an outer radial flange which is axially engaged by a separate head portion if the head portion is positioned on the shank portion between the outer flange and the upper end of the shank portion, the head portion being axially attachable to the shank portion.

* * * * *